United States Patent [19]

Guthrie

[11] Patent Number: 4,841,757
[45] Date of Patent: Jun. 27, 1989

[54] BICYCLE LOCK

[76] Inventor: Richard A. Guthrie, 62 W. Ivy Glen, Mesa, Ariz. 85201

[21] Appl. No.: 203,690

[22] Filed: Jun. 7, 1988

[51] Int. Cl.$^4$ .............................................. E05B 71/00
[52] U.S. Cl. ........................................ 70/236; 70/185
[58] Field of Search ............... 70/236, 234, 185, 196, 70/233, 235, 182, 183, 184, 225, 226

[56] References Cited

U.S. PATENT DOCUMENTS

| 592,242 | 10/1897 | Eberle | 70/236 |
|---|---|---|---|
| 2,055,149 | 9/1936 | Hershbain | 70/236 |
| 3,774,421 | 11/1973 | Stephens | 70/234 |
| 4,509,349 | 4/1985 | Partridge | 70/185 |

FOREIGN PATENT DOCUMENTS

| 235319 | 11/1903 | France | 70/236 |
|---|---|---|---|
| 3980 | 4/1947 | United Kingdom | 70/236 |

Primary Examiner—Robert L. Wolfe
Attorney, Agent, or Firm—Donald W. Erickson

[57] ABSTRACT

This invention is directed at a bicycle lock which is positioned within the frame, front riser post or seat support post, of the bicycle and secure from external compromise by ordinary handtools. In one embodiment, a key actuated slotted rotary engagement locking disk selectively engages and disengages a slotted locking disk affixed to the axle of the pedal crank. In another embodiment, a key actuated rack and pinion combination cooperates with a slotted disk on the pedal crank axle to lock and unlock the pedal crank. In another embodiment of the invention a supplemental external locking system for locking the bike to a post or the like is provided which is used in conjunction with the internally positioned locking systems.

8 Claims, 5 Drawing Sheets

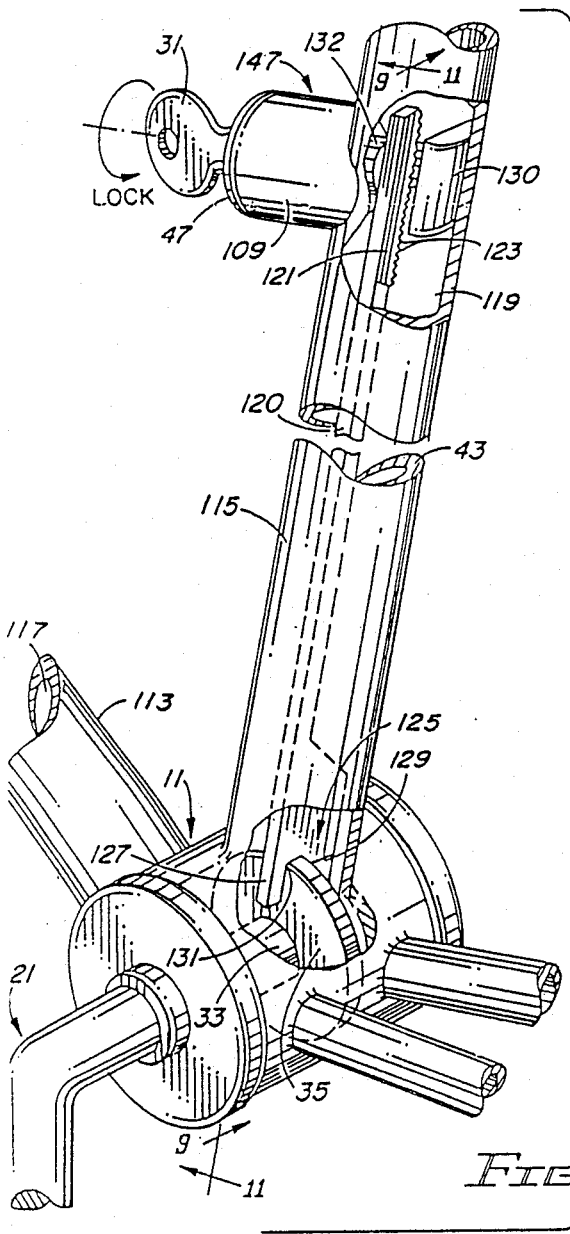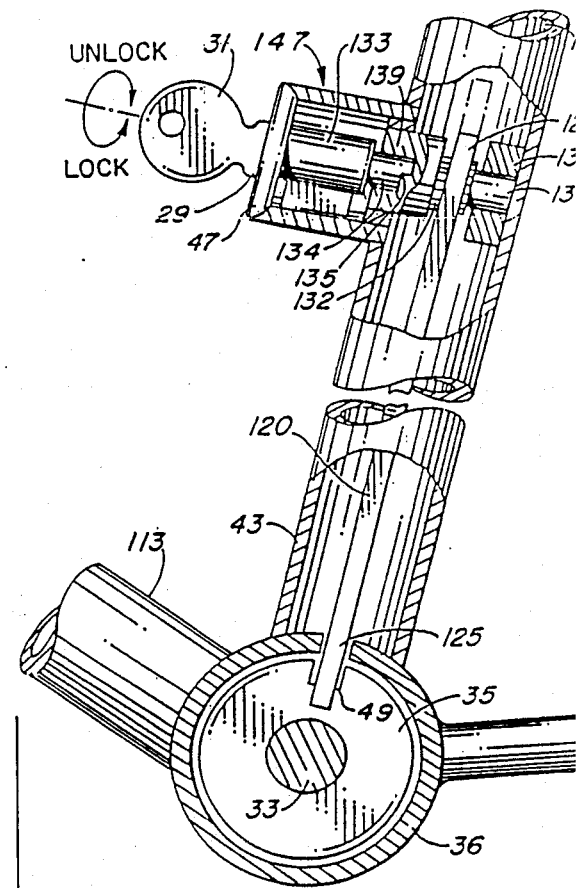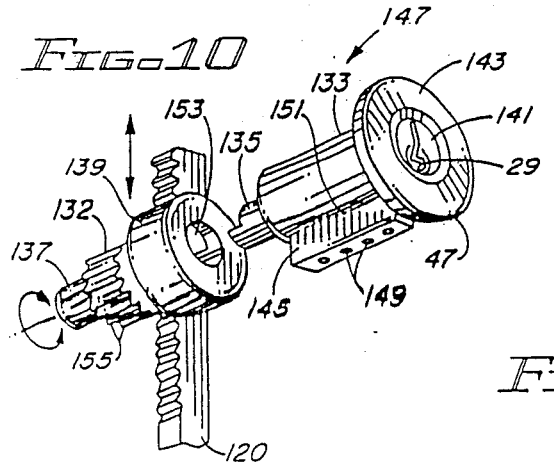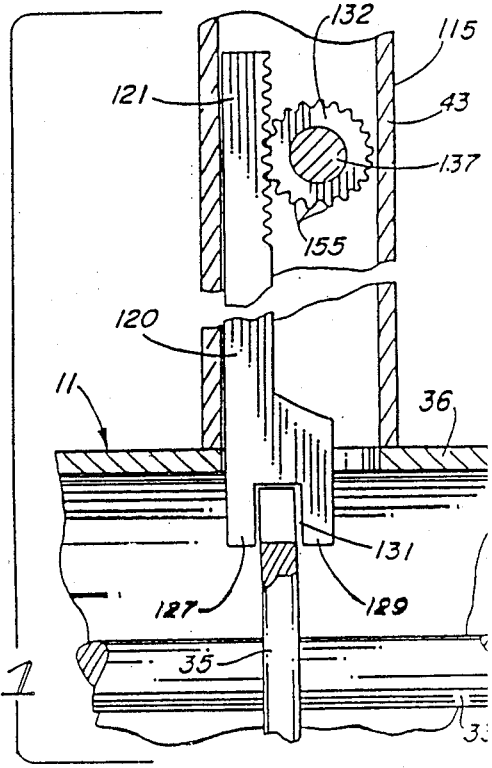

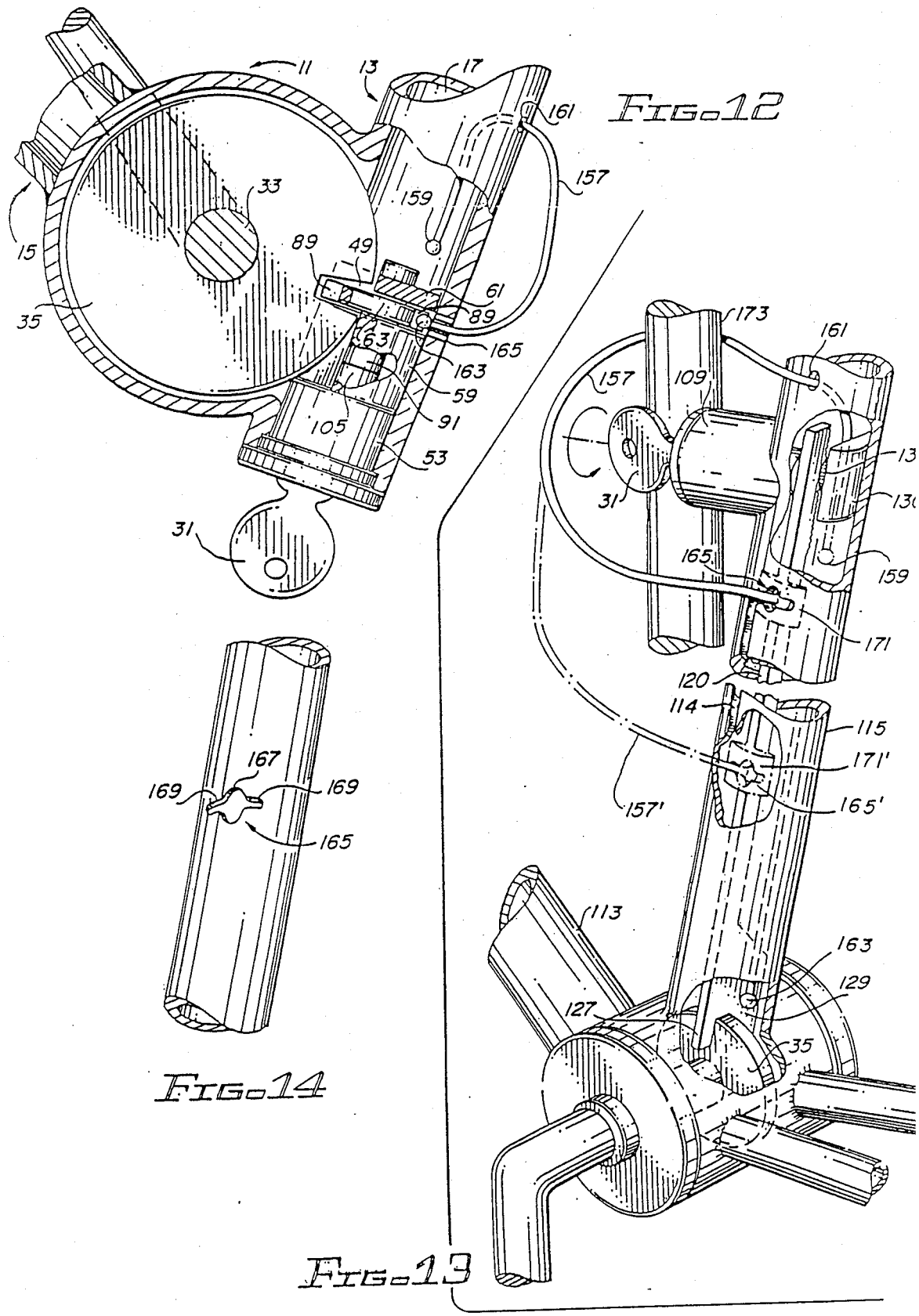

BICYCLE LOCK

BACKGROUND OF THE INVENTION

Thousands of bicycles are stolen each day. Existing and presently used locking devices for bicycles invariably employ a wire cord or chain which, together with a key or combination padlock, is used to secure the bicycle to a post, bicycle rack or the like. In view of the number of bicycles stolen each day, this method of locking is not effective. The external locking means is too easily and readily compromised using a commonly available wire, chain or bolt cutter handtool. A principal object of the present invention is to provide an effective locking system for bicycles which is internally secured within the frame of the bicycle and not subject to compromise by commonly available handtools. Another object of the present invention is to provide a locking system for bicycles which has both an internally secure locking mechanism and an external locking mechanism to prevent removal of a bicycle.

SUMMARY OF THE INVENTION

This invention is directed at a bicycle lock which is internally mounted within the framework of the bicycle and secure from external compromise by ordinary handtools. The bicycle lock which is key operated is mounted, e.g., within the hollow front riser post or seat support post. The lock system includes means for engaging a locking disk fixed on the pedal crank axle which makes it impossible to pedal the bike when the lock is engaged. By a simple turn of the lock key, the lock means is disengaged and the bike is operable. The internal lock means in one embodiment of the present invention comprises a slotted rotary engagement locking disk which selectively engages and disengages with a slotted lock disk on the pedal crank axle. In another embodiment of the present invention, the internal lock means comprises a rack and pinion arrangement which cooperates with a slotted lock disk on the pedal crank axle to lock and unlock the pedal crank of the bike. In another embodiment of the invention, there is provided external locking means for locking the bike to a bike rack or other stationary object which is used in conjunction with either of the internally positioned locking systems.

BRIEF DESCRIPTION OF THE DRAWINGS

FIG. 8 is a perspective view and partial section of another embodiment of a bicycle lock of the present invention utilizing an internally positioned rack and pinion combination;

FIG. 9 is a cross section along line 9—9 of FIG. 8;

FIG. 10 is a perspective view, in detail, of components of the lock assembly of FIG. 8;

FIG. 11 is a cross section view along line 11—11 of FIG. 8;

FIG. 12 is an elevational, partial section, view of the bicycle lock of FIG. 1 showing supplemental external locking means for securing the bicycle to a post or rack;

FIG. 13 is an elevational, partial section, view of the bicycle lock of FIG. 8 showing supplemental external locking means for securing the bicycle to a post or rack; and FIG. 14 is a perspective view showing in detail means for attaching and detaching the supplemental locking means of FIGS. 12 and 13.

DETAILED DESCRIPTION OF THE INVENTION

Figure 1:
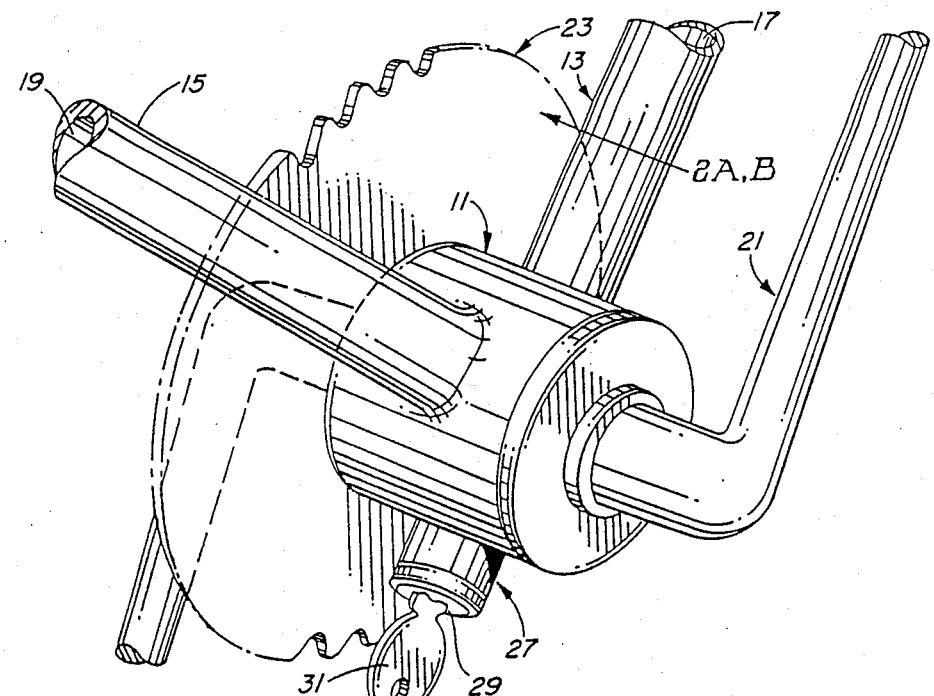
FIG. 1 is a perspective view of a bicycle lock of the present invention utilizing an internally positioned slotted locking disk.
Figure 2A:
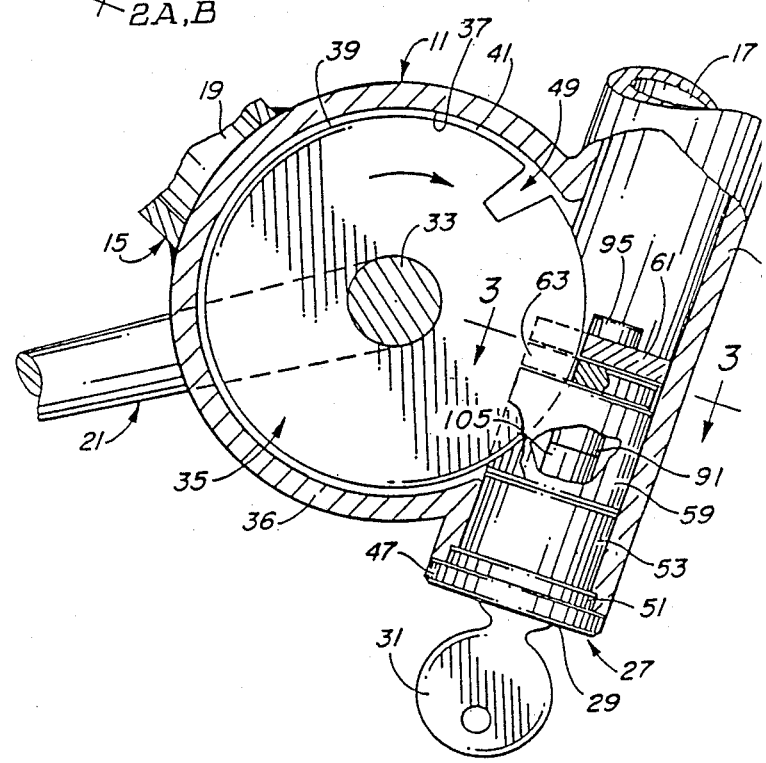
FIG. 2A is a partial section view along line 2A—2A of FIG. 1 in which the lock system is in the unlocked position.
Figure 2B:
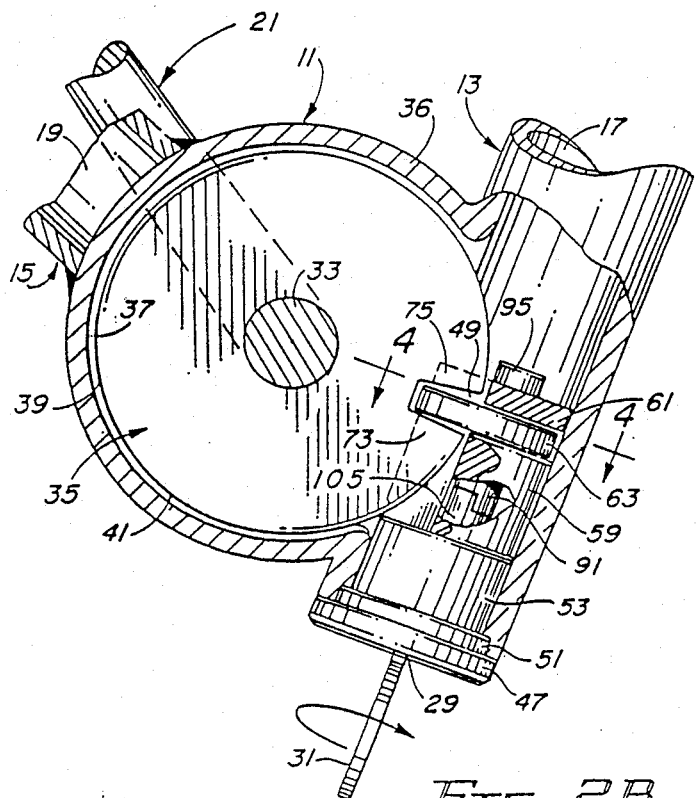
FIG. 2B is a partial section view along line 2B—2B of FIG. 1 in which the lock system is in the locked position.

Referring to FIG. 1, there is shown in partial section a bicycle frame having a pedal crank housing 11, a front riser or support post 13, a seat support post 15, pedal crank assembly 21 and a drive sprocket 23. Posts 13 and 15 have a hollow central interior 17 and 19, respectively. Within the hollow central interior 17 of post 13 is positioned a lock assembly 27 which is in communication with the interior of the crank housing 11 as shown in FIGS. 2A and 2B, for example. Within the crank housing and securely attached to the pedal drive axle 33 is a pedal crank locking disk 35 having a locking disk slot 49 which cooperatively accepts rotary engagement locking disk 63 when the biker wishes to lock the bike. When the bike is locked, as shown in FIGS. 2B and 4, it is impossible to pedal the bicycle.

Figure 3:
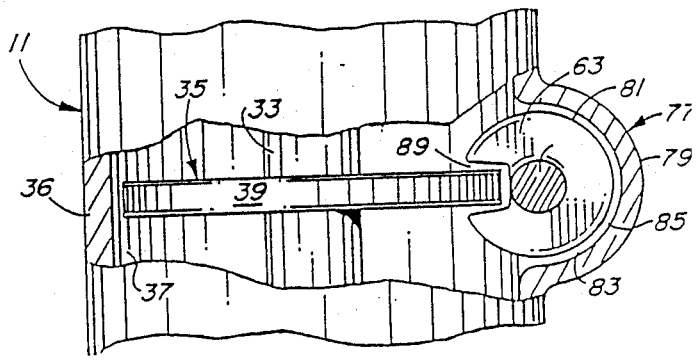
FIG. 3 is a top view, partial section along line 3—3 of the locking disk and lock assembly of FIG. 2A in the unlocked position.

In addition and importantly, it is impossible for the bicycle thief to neutralize or compromise the bicycle lock externally by using a hacksaw or other cutting handtool without destroying the bicycle drive mechanism or frame itself and rendering the bike inoperable. With the pedal crank locking disk 35 and locking assembly 27 having rotary locking disk 63 located internally within crank housing 11 and post 13, respectively, the bicycle lock system of the present invention is not externally accessible. The pedal crank locking disk 35 is secured to the pedal crank drive axle 33, for example, by welding or cast as an integral part of the pedal crank assembly. The locking disk 35 is centrally positioned within the crank housing 11 with the outer peripheral edge 39 of the disk spaced slightly from the interior surface 37 of the crank housing wall 36 to provide clearance space 41 for free rotation when the bike is not locked. The crank locking disk 35 can have one slot (49) as shown or a plurality of slots. Referring to FIGS. 2A and 2B, disk 35 is aligned with the rotary engagement locking disk 63 and the key 31 turned so that disk 63 rotates and engages slot 49. To unlock the bike, the biker simply inserts key 31 into key slot 29 and turns the key in the opposite direction so that slot 89 of disk 63 is aligned with disk 35 as shown in FIG. 3. The pedal assembly 21 is then free to rotate in the normal manner.

Figure 5:
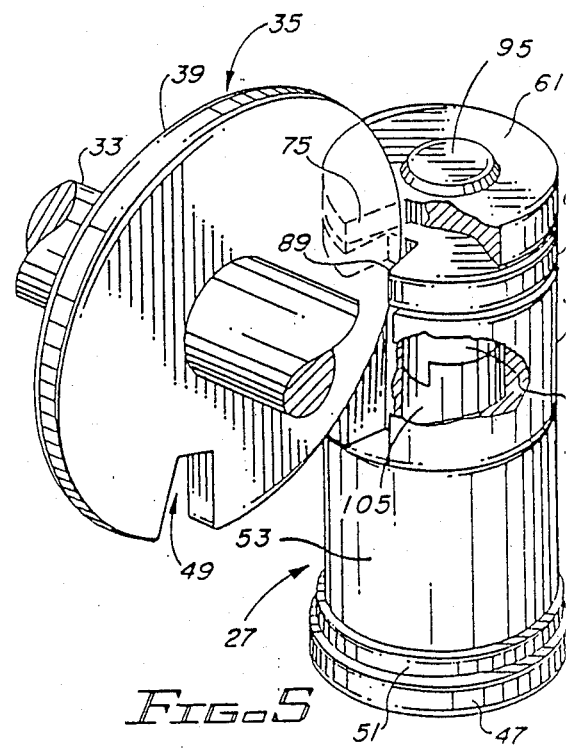
FIG. 5 is a perspective view of the lock system.
Figure 7:
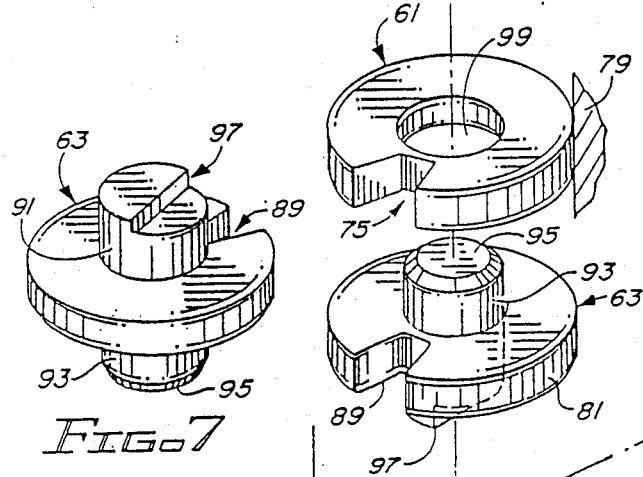
FIG. 7 is a perspective view, inverted, of the locking disk of FIG. 6.
Figure 6:
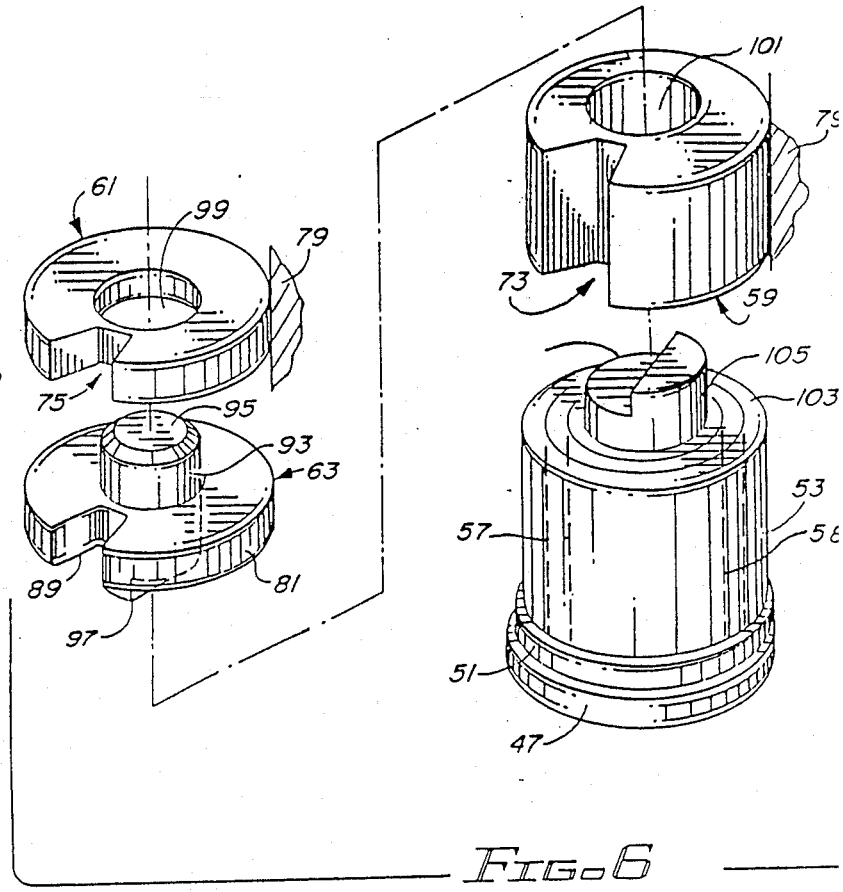
FIG. 6 is a perspective view of components of the lock assembly.

The lock assembly 27 of the present invention, as best seen in FIGS. 5, 6, and 7, is comprised of a lock housing 53 having a centrally aligned lock cylinder housing 57 containing a conventional barrel lock 58; a relatively thick negative spacer element 59 which has an aperture 101 for cooperatively sliding over key actuated shaft portion 105 of the barrel lock; a rotary engagement locking disk 63 having a centrally aligned shaft of which the front shaft portion 91 has a stepped end portion 97 which cooperatively mates and engages with the stepped end portion 107 of the lock shaft portion 105; and a relatively thin negative displacement bushing 61 having an aperture 99 which cooperatively fits over the plane end portion 95 of rear shaft portion 93 of locking disk 63. Spacer element 59 and bushing 61 are provided with slots 73 and 75, respectively, of sufficient width and depth to permit free rotation of pedal crank locking disk 35. The face or front of the lock housing 53 is provided with a slotted end cap 47 for receiving key 31 and a conical collar 51 which are securely fitted to the lower end of support post 13.

Figure 4:
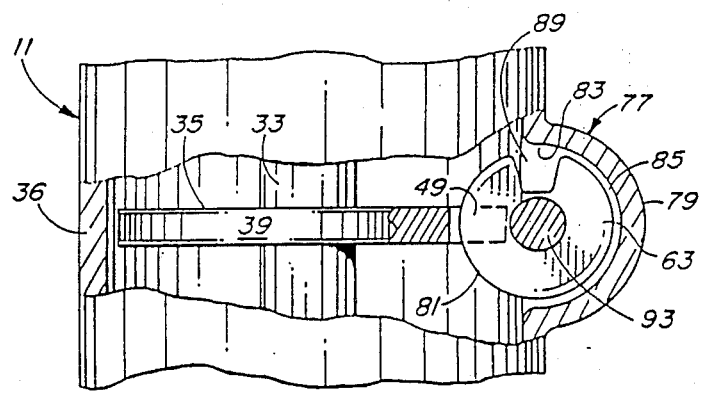
FIG. 4 is a top view, partial section along line 4—4 of the lock assembly of FIG. 2B in the locked position.

The lock assembly 27, as shown in FIGS. 1-4, is securely positioned within the lower end of post 13. The post 13 at its lower end is cylindrical and becomes semicircular as it joins with crank housing 11 to form a tangentially positioned semicircular housing 77 for the lock assembly. The outer wall 79 of housing 77 is of sufficient circumference to provide a clearance space 85 between the housing inner surface 83 and the outer periphery 81 of locking disk 63 for rotation thereof, as shown in FIGS. 3 and 4. Fitted within lock housing 53 is a barrel type lock 58 of known form such as the barrel locks commonly used in automobile doors or door handles and shown in FIG. 10.

The rotary locking disk 63 is shown as having only one slot 89 in FIGS. 2A-7. It can have additional slots so long as the structural strength is not sacrificed.

In another embodiment of the present invention shown in FIGS. 8-11, there is provided a bicycle lock system having internally positioned rack and pinion members which cooperate with locking disk 35 to lock and unlock the pedal crank assembly 21. In this embodiment, the lock assembly 147 is mounted on seat post 115 and in communication with the hollow interior 119 of the post. The lock assembly, which is mounted above pedal crank housing 11, has a pinion gear 132 which engages an elongated longitudinal rack 120 at its top end portion 121 for upward and downward movement of the rack when the key 31 is turned. The rack at its bottom end portion 125 is bifurcated or fork-like to form prongs 127 and 129 which cooperatively mesh with and straddle crank locking disk 35 within the hollow interior of housing 11. A clearance space or slot 131 between prongs 127 and 129 of sufficient width and heighth is provided in the bottom of the rack to permit free rotation of the crank locking disk when the bicycle lock is in the unlocked position as shown in FIG. 11. When the key is turned to the locked position, the bottom of rack 120, at the apex or juncture of prongs 127 and 129, engages disk 35 at slot 49 so that pedal assembly 21 cannot be rotated until the key 31 is turned to the unlocked position.

The lock assembly is provided with a lock housing 109 in which there is centrally positioned a lock cylinder housing 133 containing a conventional barrel lock 151 with pin housing 145 and apertures 149 for key adjustment. A lock shaft portion 134 having a stepped end 135 extends from the cylinder housing to mate with and engage stepped end receiving member 139 through aperture 153. To the face of receiving member 139 is attached pinion gear 132 having a centrally positioned plane end shaft 137 which is rotatably positioned in end block 130. The receiving member, pinion gear, and plane end shaft can be cast as a single integral member. The top end portion 121 of rack 120 is provided with teeth 123 which mesh with and engage pinion gear teeth 155 so when the lock shaft 134 is turned by key 31, the rack is raised or lowered in accordance with the direction of the key turn. The face of the lock cylinder housing is provided with a face-pin retainer 143 having an indentation 141. As an alternative to mounting the lock assembly on seat support post 115, it can be mounted on and within riser post 113 and function equally as well.

Referring to FIG. 12, in this embodiment of the invention, there is provided external means for locking the bike to a post or the like in conjunction with locking the pedal cranking assembly at the same time. The external locking means of FIG. 12 comprises a tough cable 157 having a beaded end 159 at its upper end. The beaded end 159 is larger than aperture 161 so that the cable cannot be pulled loose from riser post 13. The lower end of the cable is provided with beaded end 163 which is inserted through shaped aperture 165 and into slot 89 of rotary locking disk 63. The key lock, when turned to the locked position, causes disk 63 to engage with beaded end 163 and draws or moves the beaded end inside of riser post 13. In this embodiment, it is preferred that disk 63 have two or more slots 89 such as two slots which are diametrically positioned as shown in FIG. 12 wherein the internal and external locking means are in the unlocked position. The shaped aperture 165, shown in detail in FIG. 14, comprises a central opening 167 of sufficient diameter to accept beaded end 163 and wing openings 169 of sufficient width to accept cable 157 but not beaded end 163. When the key is turned to the locked position, disk 63 causes beaded end 163 to move inside of post 13 and the cable moves into the winged opening. It is then impossible to withdraw beaded end 163, until the key is turned to the unlocked position and slot 89 is aligned with central opening 167.

Similarly, in the embodiment shown in FIG. 13, a tough cable 157 with beaded ends 159 and 163 is utilized. A longitudinally positioned slot 114 is provided in post 115. The slot is of sufficient width to accept and permit movement of the cable but is of insufficient width to permit withdrawal of bead 163 when the bike is in the locked position. Post 115 is provided with shaped aperture 165 which allows for insertion of beaded end 163 into the interior of the post and in engagement with slotted member 171 which is attached to rack 120. The outer face of member 171 has a shaped aperture 165 also to facilitate insertion and removal of beaded end 163. When the bike is in the unlocked position, member 171 is in alignment with shaped aperture 165 on the post, cable 157 is wrapped around anchor post 173 and beaded end 163 inserted into member 171. When lock 31 is turned to the locked position, member 171 moves to position 171' and simultaneously the bottom of rack 120 engages crank locking disk 35. The bike is then locked internally and externally. As an alternative to slotted member 171 for engaging the bead 163 internally, a generally semi-circular or U-shaped notch, of sufficient size to receive bead 163, can be provided in the outer edge of rack 120. The notch, of course, must be aligned with shaped aperture 165 in wall of post 115 when the lock assembly is in the unlocked position. Optionally beaded ends 159 and 163 can be weighted to facilitate movement of cable 157 such as pushing the cable into the interior of post 13 or 115 for storage when the bike is unlocked.

Although the invention has been dexcribed in detail relative to a preferred embodiment, it is to be understood that such was for illustration and explanatory purposes and various modifications in design can be made by those of ordinary skill in the art without departing from the spirit and scope of the invention.

What is claimed is:

1. A bicycle locking system positioned internally within the pedal crank assembly housing and within a hollow support post of the bicycle frame, said pedal housing and support post being in internal open communication at the juncture thereof, said locking system being characterized in that it is impossible to pedal the bicycle when the locking system is in the locked position, which comprises:
   (a) a locking disk secured to the axle of the pedal crank assembly and having at least one slot in the outer peripherary thereof, said locking disk having a circumference slightly less than the internal circumference of the pedal crank housing and
   (b) a lock assembly positioned within said hollow support post which comprises a key actuated lock shaft and a rotary engagement locking disk which is directly responsive to movement of the key actuated lock shaft, said rotary locking disk having at least one slot in its peripherary, said slot of the rotary locking disk being of sufficient width and depth to permit free rotation of said pedal axle locking disk when the locking system is in the unlocked position, and said rotary locking disk and pedal crank axle locking disk being in communication at the juncture of the crank housing and said support post.

2. The bicycle locking system according to claim 1 wherein the lock assembly is positioned within the front riser post of the bicycle frame.

3. The bicycle locking system according to claim 1 wherein the pedal axle locking disk is centrally positioned on the pedal axle.

4. A bicycle locking system positioned internally within the pedal crank assembly housing and within a hollow support post of the bicycle frame, said pedal housing and support port being in internal open communication at the juncture thereof, said locking system being characterized in that it is impossible to pedal the bicycle when the locking system is in the locked position, which comprises:
   (a) a locking disk secured to the axle of the pedal crank assembly and having at least one slot in the outer periphery thereof, said locking disk having a circumference slightly less than the internal circuference of the pedal crank housing and
   (b) a lock assembly positioned within said hollow support post which comprises a key actuated lock shaft having a pinion gear which is responsive to movement of said lock shaft, said pinion gear being cooperatively engaged to one end of a rack so that the rack is moved in response to movement of the pinion gear, the other end of said rack being bifurcated and adapted to straddle and engage the pedal axle locking disk slot when the locking system is in the locked position and to disengage the pedal axle locking disk when the locking system is in the unlocked position.

5. The bicycle locking system according to claim 4 wherein the lock assembly is positioned above the pedal crank housing.

6. The bicycle locking system according to claim 4 wherein the lock assembly is positioned within either the front riser support post or the seat support post of the frame.

7. A bicycle locking system according to claim 1 which includes an external supplementary locking mechanism for locking the bicycle to a post or other stationary object in conjunction with locking the pedal crank assembly at the same time which comprises a tough, flexible cable, one end of which is secured within and retained within said hollow support post and the second end of said cable is cooperatively and releaseably engaged with retention means provided in said rotary disk whereby said second end is moved into and retained in the hollow support post when the locking system is actuated to the locked position.

8. A bicycle locking system according to claim 4 which includes an external supplementary locking mechanism for locking the bicycle to a post or other stationary object in conjunction with locking the pedal crank assembly at the same time which comprises a tough, flexible cable, one end of which is secured within and retained within said hollow support post and the second end of said cable is cooperatively and releaseably engaged with retention means provided on or in said rack whereby said second end is moved into and retained in the hollow support post when the locking system is actuated to the locked position.

* * * * *